United States Patent
Willcocks et al.

(10) Patent No.: US 8,414,697 B2
(45) Date of Patent: Apr. 9, 2013

(54) HIGH RESOLUTION INK-JET PRINTING ON EDIBLES AND PRODUCTS MADE

(75) Inventors: Neil A. Willcocks, Flanders, NJ (US); Arun Shastry, Neshanic Station, NJ (US); Thomas M. Collins, Nazareth, PA (US); Alfred V. Camporini, Hackettstown, NJ (US); James M. Suttle, East Stroudsburg, PA (US)

(73) Assignee: Mars, Incorporated, McLean, VA (US)

( * ) Notice: Subject to any disclaimer, the term of this patent is extended or adjusted under 35 U.S.C. 154(b) by 0 days.

(21) Appl. No.: 12/983,777

(22) Filed: Jan. 3, 2011

(65) Prior Publication Data

US 2011/0097451 A1   Apr. 28, 2011

Related U.S. Application Data

(62) Division of application No. 09/587,108, filed on Jun. 2, 2000, now Pat. No. 7,884,953.

(51) Int. Cl.
*C09D 11/02* (2006.01)

(52) U.S. Cl. .................................. 106/31.86

(58) Field of Classification Search ............... 106/31.86
See application file for complete search history.

(56) References Cited

U.S. PATENT DOCUMENTS

| | | | |
|---|---|---|---|
| 4,531,292 A | 7/1985 | Pasternak | 33/18 R |
| 4,672,892 A | 6/1987 | Ackley | 101/35 |
| 4,905,589 A | 3/1990 | Ackley | 101/35 |
| 4,910,661 A | 3/1990 | Barth et al. | 106/31.65 |
| 5,006,362 A | 4/1991 | Hilborn | 427/3 |
| 5,397,387 A | 3/1995 | Deng et al. | 106/26 R |
| 5,433,146 A | 7/1995 | Ackley | 101/35 |
| 5,435,840 A | 7/1995 | Hilborn | 106/20 R |
| 5,453,121 A | 9/1995 | Nicholls et al. | 106/20 B |
| 5,453,122 A | 9/1995 | Lyon | 6/20 R |
| 5,466,287 A | 11/1995 | Lyon | 106/20 R |
| 5,505,775 A | 4/1996 | Kitos | 118/14 |
| 5,529,767 A | 6/1996 | Brox et al. | 624/10.2 |
| 5,630,499 A | 5/1997 | Louden et al. | 198/803.01 |
| 5,637,139 A | 6/1997 | Morelos et al. | 106/31.37 |
| 5,711,791 A | 1/1998 | Croker et al. | 106/31.35 |

(Continued)

FOREIGN PATENT DOCUMENTS

| | | |
|---|---|---|
| EP | 234376 | 9/1987 |
| EP | 321188 A2 | 6/1989 |

(Continued)

OTHER PUBLICATIONS

Pond, S.F. Inkjet Technology and Product Development Strategies, Torrey Pines Research, pp. 177-179 (2000).

*Primary Examiner* — Kaj K Olsen
*Assistant Examiner* — Veronica F Faison
(74) *Attorney, Agent, or Firm* — Fitzpatrick, Cella, Harper & Scinto

(57) ABSTRACT

Disclosed are methods of printing high resolution images on edible substrates with dispersed pigmented inks using a drop-on-demand ink-jet printer. Dispersed pigmented white inks useful with the inventive methods are also disclosed. White images having a resolution greater than 200 dpi can be printed on chocolate using the methods and inks disclosed herein. The inventive methods and inks may also be integrated with a consumer-driven site vending or e-commerce application in which the consumer provides the image to be printed and edibles bearing the printed image are prepared for rapid turn-around.

20 Claims, 2 Drawing Sheets

U.S. PATENT DOCUMENTS

| | | | |
|---|---|---|---|
| 5,778,164 A | 7/1998 | Watkins et al. | 395/117 |
| 5,795,395 A | 8/1998 | Ben-Matitayhu et al. | 118/712 |
| 5,800,600 A | 9/1998 | Lima-Marques et al. | 106/31.29 |
| 5,800,601 A | 9/1998 | Zou et al. | 106/31.65 |
| 5,930,768 A | 7/1999 | Hooban | 705/27 |
| 5,936,027 A | 8/1999 | Zahrobsky et al. | |
| 6,058,843 A | 5/2000 | Young | 101/483 |
| 6,230,073 B1 | 5/2001 | Kofman et al. | 700/204 |
| 6,267,997 B1 | 7/2001 | Ream et al. | 426/3 |
| 6,538,767 B1 | 3/2003 | Over et al. | 358/1.18 |
| 6,747,072 B1 | 6/2004 | Siddiqui | 523/161 |
| 2002/0008751 A1 | 1/2002 | Spurgeon et al. | 347/106 |
| 2002/0095231 A1 | 7/2002 | Yu et al. | 700/97 |

FOREIGN PATENT DOCUMENTS

| | | |
|---|---|---|
| EP | 705890 A1 | 4/1996 |
| EP | 739957 A1 | 7/1996 |
| ES | 2291838 | 3/2000 |
| FR | 2751451 | 1/1998 |
| GB | 2074947 A | 11/1981 |
| GB | 2205024 A | 11/1988 |
| GB | 2291838 | 2/1996 |
| WO | 96/02598 | 2/1996 |
| WO | WO 97/17409 | 5/1997 |
| WO | WO 97/35933 | 10/1997 |
| WO | WO 9829514 A1 * | 7/1998 |
| WO | WO 00/57717 | 10/2000 |

* cited by examiner

HIGH RESOLUTION INK-JET PRINTING ON EDIBLES AND PRODUCTS MADE

This application is a divisional of U.S. patent application Ser. No. 09/587,108, filed Jun. 2, 2000, which is incorporated by reference in its entirety.

BACKGROUND OF THE INVENTION

1. Field of the Invention

The invention is directed to high resolution printing on edibles using an ink-jet printer and dispersed pigmented inks. The system provides for rapid turnaround from image input to printed edible product. Methods of printing, ink formulations suitable for use with the methods, site-vending and e-commerce applications are all described herein, and are within the intended scope of the invention.

2. Description of the Related Art

Highly detailed images can be formed on chocolates using a pad printing process. In this process, the substrate is contacted with an inked pad having the image formed thereon. Sometimes, in order to prepare an image having greater resolution, the chocolate is contacted repeatedly with the pad. An example of a pad printing process is described in CA 2,057,985. While, the pad printing process can deliver highly detailed images it cannot be adapted for rapid turnaround applications. Each requested change to an image requires that a corresponding change be made to the printing pad or the manufacture of a new pad which means that pad printing will have a slow turnaround time. One object of the invention, therefore, is to provide for rapid turnaround printing of high resolution images on edibles.

Ink-jet printing systems are generally of two types: continuous jet and drop-on-demand. In continuous jet ink-jet systems, ink is emitted in a continuous stream under pressure through at least one nozzle. The stream is broken up into droplets at a fixed distance from the orifice. Typically, the ink droplets in continuous ink-jet systems are formed by a piezoelectric crystal, which is vibrated at controlled frequency adjacent to the ink stream. To control the flow of ink droplets, these inks are charged (by addition of salts and other conductive agents) and relayed in accordance with digital data signals. The droplets are passed through an electrostatic field, which adjusts the trajectory of each droplet. The droplets are either directed back to a gutter for recirculation or to a specific location on the substrate to created the desired character matrix.

In drop-on-demand systems, a droplet is expelled under pressure from a valve directly to a position on the substrate in accordance with the digital data signals. A droplet is not formed or expelled unless it is to be jetted to the substrate. The formation of droplets in drop-on demand systems can either be achieved by a piezoelectric crystal (similar to continuous jet systems) or by a thermal (bubble-jet) technique. The latter technique involves formation of ink droplets by thermally heating ink in the cartridge reservoir thereby forcing ink to be expelled in an "on-demand" basis. Typically, drop-on-demand systems print at a slower rate than continuous jet systems (due to time required to make droplets on demand) but produce higher resolution images. However, some of the commercially available printhead units (for example, manufactured by Xaar, Trident and Picojet) achieve high throughput rates even with drop-on-demand systems by using their proprietary technologies. Also, since drop-on-demand systems require no ink recovery, charging, or deflection, these systems are simpler than the continuous stream systems.

Further, continuous jet ink-jet printing systems do not yield the same high resolution images that can be obtained with drop-on-demand ink-jet systems. A typical maximum resolution for a continuous jet printer image on an edible substrate using a single printhead and a single pass printing is about 70-90 dpi.

Published European Patent Application EP 705 890 A1 discloses an ink for use with a continuous ink jet printer. The ink comprises pigment, such as titanium dioxide; binder, such as shellac or poly(1-vinyl-2-pyrrolidone); and an aqueous carrier. The binder is apparently required to increase the compatibility of the inked image with the substrate in the continuous ink-jet environment contemplated.

Other methods of decorating edibles are known in the prior art. UK Patent GB 2,291,838 B describes a machine and method for printing on an edible substrate. This patent discloses a generic ink-jet/bubble-jet head assembly together with a stepping motor for moving the head assembly. A pump provides food coloring to the head assembly from ink reservoirs. A computer provides the instructions for printing on the edible substrate.

Food colorings which are dye-based systems behave differently than dispersed pigmented inks in an ink-jet environment, and exhibit profoundly different image characteristics on edible substrates. Dye-based inks possess limited opacity and therefore do not hide dark backgrounds colors, such as milk chocolate and dark chocolate surfaces. Also, dye-based inks are not available in all colors. For example, white ink is not available as a dye system but is available only as a pigmented (dispersed) system.

The examples of the prior art do not describe methods or systems to print high resolution images on edibles using an ink-jet printer and pigmented inks. There is also no description of a system or method wherein a consumer can participate in the selection and customization of an edible product with a high resolution image and subsequently receive the customized product in rapid fashion.

SUMMARY OF THE INVENTION

Figure 1A:
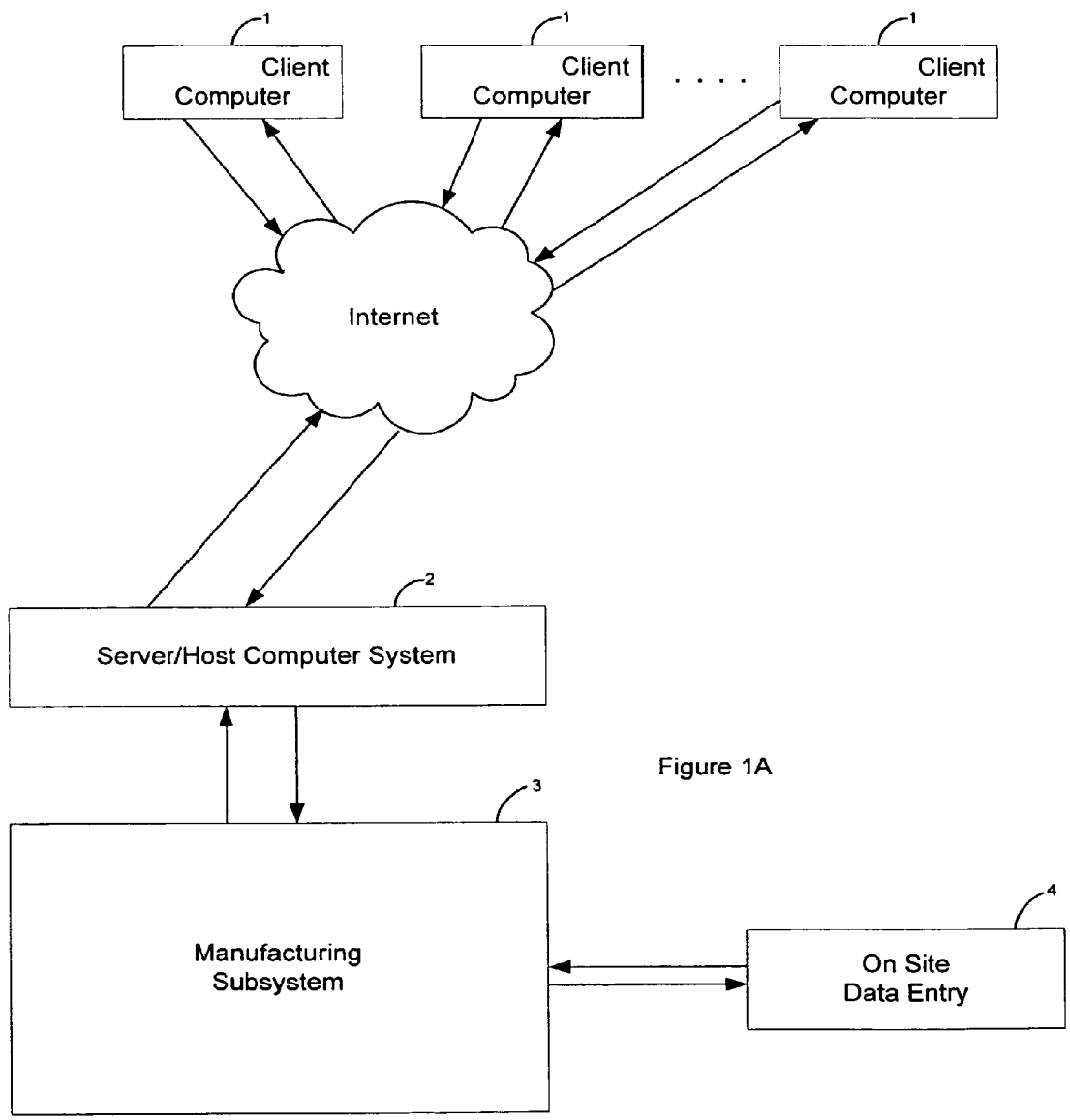
FIG. 1A is a block diagram showing the elements of a system for preparing edibles having high resolution images ink-jet printed thereon.

It is an object of the invention to provide a customizable process for preparing edibles having high resolution images that have been selected by a consumer ink-jet printed thereon according to the invention that comprises the steps of: selecting digital image information; processing the digital image information to form processed digital image information; ink-jet printing an image corresponding to the processed digital image information using dispersed pigmented ink; wherein said step of selecting digital image information is performed by an individual consumer.

The input of the individual consumer is a key component of the customizable process according to this embodiment of the invention. Rapid turnaround from the consumer's selection of digital image information to finished product having high resolution images printed thereon makes possible the consumer's involvement in the manufacture of personalized products.

In preferred embodiments, the above system for preparing edibles having high-resolution, consumer selected images printed thereon, is embodied in connection with a rapid-turnaround site-vending or e-commerce application. In these embodiments, the consumer selects digital image information, at a vending site or over the internet, for example. The information is processed, remotely or on-site, and printed onto an edible substrate with an ink-jet printer using the dispersed pigment food grade inks of the invention. The entire process is accomplished according to consumer selections with rapid turnaround. In some embodiments, the turnaround can be on an as-you-wait basis.

It is a further object of the invention to provide a process for printing high resolution images on an edible substrate comprising the steps of: (a) providing digital image information; (b) processing the digital image information to prepare processed digital image information; and (c) printing an image from the processed digital image information on an edible substrate with a drop on demand ink-jet printer using dispersed pigment food-grade ink to obtain a printed image having resolution greater than 200 dpi. Significantly, the image resolution (as measured in dots per square inch, (dpi)) achieved using the process of this invention may be obtained even using a single printhead and single pass printing. Of course, the invention set forth herein is not limited to a single printhead or single pass printing, but also includes the use of multiple printheads and/or multiple pass printing.

It is a further object of the invention to provide a system for preparing edibles having high-resolution, consumer-selected, dispersed pigmented ink images printed thereon with an ink-jet printer, comprising: a digital image information selection device in communication with an image processor for producing processed digital image information and an ink-jet printer adapted to print a high resolution image corresponding to said processed digital image information on an edible substrate.

It is also an object of the invention to provide novel edible dispersed pigmented ink compositions which can be used in drop on demand ink jet systems to deliver high resolution images.

Novel edible, ink-jettable ink compositions according to the invention comprise: a food-grade white pigment, a dispersant, an alcohol, and water.

In a particular embodiment, the present invention comprises a food-grade, drop-on-demand ink jettable ink consisting essentially of: titanium dioxide, glycerine and/or propylene glycol and/or polypropylene glycols, a lower alcohol, water, and optionally a surfactant. In a preferred embodiment, the ink is substantially free of binder.

It is also an object of the invention to provide high resolution images on edible substrates with dispersed pigmented inks printed with drop-on demand ink-jet technology. Particularly preferred embodiments according to the invention include white ink images having a resolution greater than 200 dpi, and more preferably between 300 and 1200 dpi, printed with drop-on demand ink-jet technology on chocolate substrates.

In a particular embodiment, novel high resolution printed edible products are described, wherein a printed image is printed on a surface with localized three dimensional (3-D) features, for example an irregular or uneven surface.

It is a further object of the invention to provide a computer-readable medium storing executable code adapted to control a server computer on a network to perform a method for facilitating custom manufacturing of a decorated edible item on the basis of instructions of a user. The method includes communicating over the network with a client computer of the user, receiving over the network, from the client computer, image information submitted to the client computer by the user, and communicating the received image information to an ink-jet printer to cause printing on an edible item of a high quality image that corresponds with the received image information.

DESCRIPTION OF THE PREFERRED EMBODIMENTS

An important motivation behind the use of ink jet printing is that this type of printing allows rapid turnaround from the selection of an image to the printing of edibles bearing the selected image. The rapid turnaround enabled by the use of ink-jet printing (as opposed to pad printing) permits a consumer to dictate the steps of digital image information selection and image processing. The rapid-turnaround, consumer-centered approach to printing on edibles permits the introduction of applications heretofore not deemed possible, or if possible, impractical.

In some embodiments, the present invention comprises a system for preparing edibles having high-resolution, consumer-selected and/or consumer-provided images printed thereon. The consumer's involvement in the preparation of an individualized edible is a key component of these embodiments of the invention. Thus, in the system, a digital image selection device is consumer-driven.

The process for printing high resolution images on an edible substrate according to the invention comprises, in the first instance, the step of providing digital image information. The source of the digital image information is not particularly limited. Digital image information for use with the printing process of the present invention may be in the form of an electronic file (on disk or otherwise), or may be transmitted from a source. Providing digital image information may be accomplished, for example, with a keyboard, a digital camera, a scanner, a digital video camera, or the image may be provided in pre-recorded image format. Presently available technology includes many sources of digital image information that would be known to those of ordinary skill in the art, and which could be readily used in the step of providing digital image information.

Digital information must be in communication with the image processor. Communication may be effected over the Internet, by a computer, through computer cables, wiring, fiber optic cabling, or other means through which digital image information can be transmitted. Specifically contemplated herein is an embodiment wherein a digital image information selection device is incorporated with the image processor. For example, a digital camera typically includes options for processing an image. In this situation, the digital image information selection device is said to be in communication with the image processor. Likewise, when digital image information is captured by a digital image information selection device and placed on a storage medium, and thereafter the digital image information is loaded into a software package for processing the image, the digital image information selection device is said to be in communication with the image processor. Similarly, when digital image information is received over the Internet by the server functionality of the present invention, this will constitute the communication. The structural details of these programs or communicating devices are well known.

In preferred embodiments, the digital image information is provided under the direction or control of individual consumers. A site-vending application can include an area, such as a kiosk, where the consumer is provided with a digital camera, keyboard, computer terminal or the like to prepare individualized digital image information. Of course, any type of device capable of providing digital image information, such as personalized messages, sentiments or a clip-art image selected by the consumer from a library of such images may be used. The digital image information may be then processed at the site and printed on an edible substrate, such as chocolate, on an as-you-wait basis.

In a preferred embodiment, consumers provide individualized digital image information at a computer which is linked on-line to the internet. In either the site vending or internet embodiments of the present invention, there is rapid turnaround between the consumer's selection of digital information and obtaining edibles printed with the selected images.

In a particularly preferred embodiment of the present invention, the system utilizes a wide area network (WAN) such as the Internet to receive custom orders from consumers for designs to be printed on the edible items. The system preferably includes an Internet (TCP/IP compliant) server that interacts with consumer client computers using the client computer's graphical user interface (GUI). The interface with the consumer preferably allows the consumers to interactively peruse options for decoration of edibles, and more preferably, the ability to preview what the final product will look like. The above functionality is preferably achieved using a combination of server side applications, such as common gateway interface programs (CGI), for allowing the server to accept search terms and interface with databases, and client side applets, such as Java applets, or the like, which execute in client browser software.

A preferred implementation of the consumer customized manufacturing system of this present invention is illustrated in block diagram form in FIG. 1A. In that figure, consumers operating client computers 1 are connected to a wide area network (WAN) such as the Internet. Such connection can be direct or via an Internet service provider (not shown). The client computers 1 each preferably include communications hardware and an operating system with graphical user interface (GUI) functionality to allow for interface with the Internet. Each client computer preferably has graphical World Wide Web (Web) browser software, such as Netscape Navigator or Microsoft Internet Explorer, loaded thereon operable to read and send Hypertext Markup Language (HTML) forms from and to an Hypertext Transport Protocol (HTTP) server on the Web. The client computer 1 preferably is operable to act as a virtual machine to run Java applets, or the like, downloaded by the browser from the server.

Server/host computer system 2 receives information from consumer client computers 1 over the Internet. The server/host computer system 2 preferably includes hardware, HTTP compliant software, an operating system and common gateway interface (CGI) software for interfacing with input queries and sources of data.

Manufacturing subsystem 3, to be described in more detail below, includes the hardware and software necessary to interface with the server/host computer system 2 and to use the input information to custom manufacture decorated edible items. On site data entry 4 allows on site entry by consumers of custom orders as an alternative to receipt of this information over the Internet.

Figure 1B:
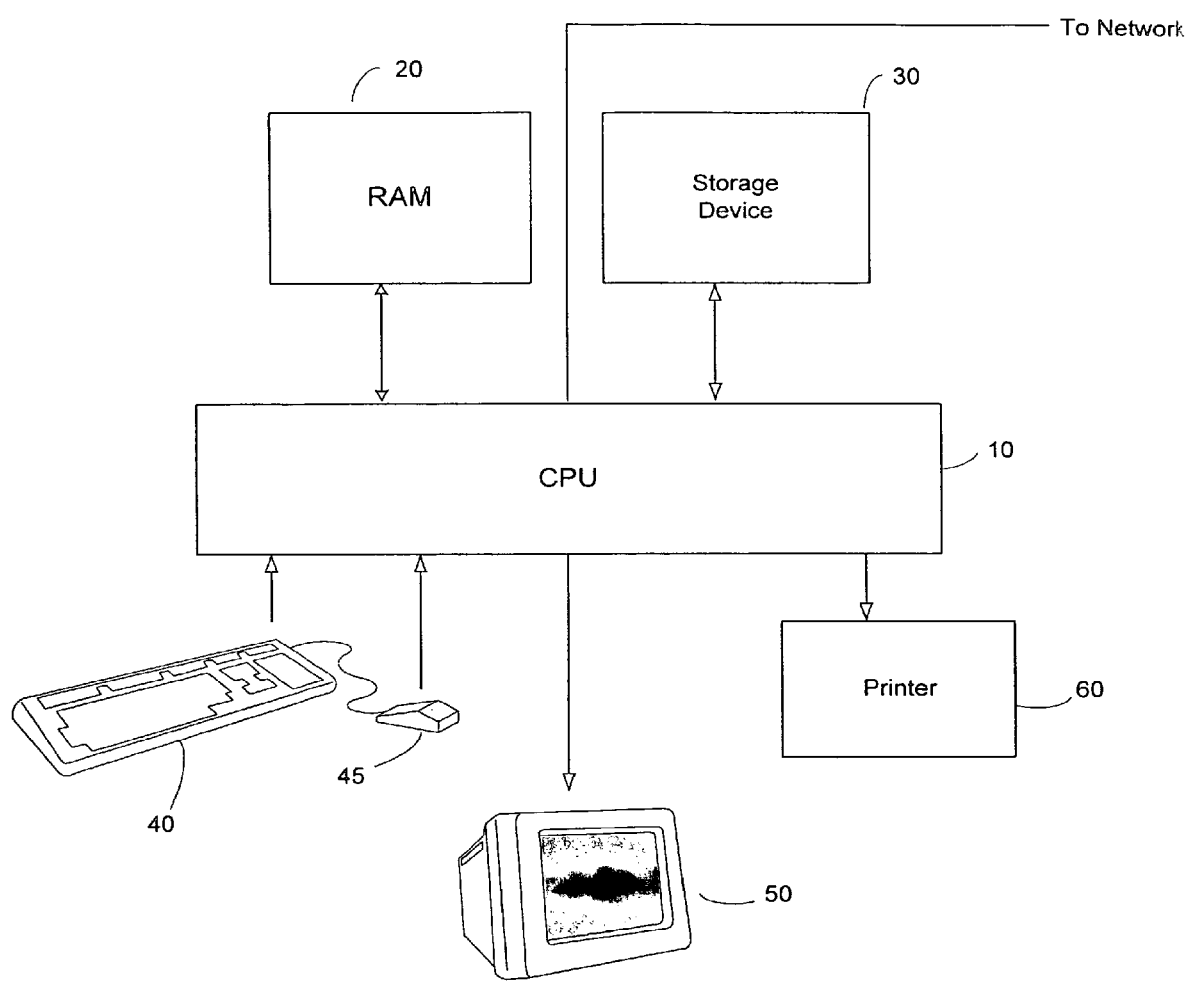
FIG. 1B is a block diagram of a manufacturing subsystem of the system of FIG. 1A.

A preferred implementation of manufacturing subsystem 3 is illustrated in block diagram form in FIG. 1B. Central Processing Unit (CPU) 10 is a computer having the functionality to run software programs, communicate with outside sources of date, and control peripheral devices. Preferably, the CPU 10 is operable to configure data for graphical display from input data received from server/host computer system 2 and on site data entry 4, as well as from graphical data files stored in storage device 30, or RAM 20. A user can interface with the CPU 10 using keyboard 40 and/or mouse 45, preferably using a GUI operating system. Printer 60 is used to decorate the edible items under the control of the CPU 10 based upon the graphical data. Prior to printing, the graphical data may be subjected to modification by the user of the CPU 10, if necessary, by using the keyboard 40 and/or mouse 45 in conjunction with the GUI.

In operation, in the Internet implementation, a consumer typically would type in a Uniform Resource Locator (URL) of the server/host computer system 2 and receive from the server/host computer system 2 an interactive form, such as an HTML document, as well as any Java applets, or the like, necessary to allow the consumer to view and submit his or her options for customizing the decoration of the edible items. The applets and CGI programs do verifications to ensure, for example, the consumer does not chose too large a decoration for the edible. Assuming the consumer request is within appropriate limits, the server acts as an intermediary to pass the requested information along to the manufacturing subsystem for actual printing under the control of CPU 10.

An example of the integrated system of the present invention includes a method in which the consumer selects digital image information while on-line. The consumer selects digital image information by entering from the keyboard, selecting from a library of images, inputting a digital photograph, remotely controlling the taking of a live digital photograph or video image, or other mode available on-line. The consumer then communicates, by conventional Internet interfacing techniques, the selected digital image information through server/host computer system 2, to remote image processing functionality operating in CPU 10.

Alternatively, the consumer may simply invoke an image processor while on-line and communicate, in real time, the digital image information to a program for processing an image. Thus, the step of processing the digital image information to produce processed digital image information does not have to be done remotely, but may be accomplished while the consumer is on-line, and under the interactive, real time supervision of the consumer. After the digital image information has been communicated to the image processing functionality of CPU 10, and processed digital image information has been produced, the processed digital image information is transmitted to an ink-jet printer for printing on an edible substrate.

The server/host computer system 2 and on site data entry 4, preferably, in addition to communicating to the manufacturing subsystem, communicates with a financial computer of the system to utilize input customer credit card information or the like for payment for the custom decorated edible items. Further, the server/host computer system 2 and on site data entry 4, preferably, in addition to communicating to the manufacturing subsystem and the financial computer of the system, also communicates with an inventory management computer system to coordinate the rapid fulfillment of the customer order through timely shipment of the customized product.

In some circumstances, the consumer may be involved in the step of processing the digital image information by changing visual parameters, such as colors, tones, brightness, contrast, or the size and aspect ratio of the image, or by cutting-and-pasting or merging images, and the like.

If the digital image information is provided over the Internet, software, in the form of Java applets, or the like, for processing the image on the consumer's client computer can be provided on-line. Alternatively, the consumer may be provided with an image processor for digitally processing the image at the site where the digital image information is provided, for example at on-site data entry 4. Software packages for processing digital image information are known, and the invention is not particularly limited in this regard.

An image processor is, generally speaking, a software package that permits sophisticated alteration of digital image information. As indicated above such programs are known in the art. Commercially available programs that may serve as image processors include, without limitation, Adobe Photoshop and Microsoft Photo Editor. Less involved image processors are contemplated, and might include, without limitation, standard picture controls available on a digital still camera or digital video camera.

Certain sub-steps involved in the step of processing the digital image information may be "invisible" to the consumer, notwithstanding how the image is provided. By "invisible" in this context is meant that certain sub-steps of image processing will likely take place without the direct involvement of the consumer. This is because certain image processing steps are known from experience to be suitable for particular substrates, such as taking the negative of an image to be printed in white on chocolate, and these steps would not be expected to be readily apparent to the consumer. Likewise, in some instances it may be desirable to resolve the digital image information into a series of images that are printed on top of one another to create a higher resolution image. This sub-step of resolving the image into a series of image layers is the type of sub-step that might be "invisible" to the consumer.

In a preferred embodiment[s], the digital information selection device is provided at the same site where the image processor and the ink-jet printer are located. This type of embodiment can be referred to as a site-vending application, where the consumer selects digital image information, optionally participates in the processing of the digital image, and then waits while an edible bearing the selected high-resolution image is produced. Of course, the turnaround need not be on an as-you-wait basis. The consumer may place an order and return for it. Nevertheless, rapid turnaround of individually customized edibles is contemplated using the systems, processes and inks according to the invention.

In a particularly preferred embodiment, the digital information selection device, image processor, and the ink-jet printer are integrated in a single portable apparatus. For example, a portable apparatus would find application with photographers taking photographs at special occasions such as weddings, reunions, etc. The rapid turnaround capability of the invention would allow the capturing of images of the participants of the occasion and the delivery of confectionery products with their images while they are still at the occasion.

While the preferred embodiments have been described above in relation to digital image selection via software running on a consumer's client computer 1, or via on-site data entry 4, the digital image information selection device of the present invention is not limited to the illustrated embodiments. Examples of such selection devices for use on-site may include a keyboard or computer terminal, a live video camera image acquisition device, a digital still camera image acquisition device, a scanner, a reader for reading digital information, or any other type of device for supplying digital image information known in the art.

The step of printing an image on an edible substrate according to the invention utilizes printer 60, an apparatus that may be described as a conventional ink-jet printing apparatus modified to operate using the edible ink of this invention and modified to print on the edible substrates of the invention. The preferred ink-jet printing apparatus is a drop-on-demand ink-jet printing apparatus, comprising a cartridge for holding ink which is integrated with a print head for printing on the substrate. The apparatus comprises a driver for driving the print head according to instructions corresponding to the processed digital image information received. The apparatus typically comprises a conveyer for causing relative motion between the substrate and the print-head.

Once the digital image information has been provided, the image is processed to prepare processed digital image information. This information is then communicated to the printer in appropriate form to enable the printer to produce the high resolution printed image on the edible product. Of course, edible substrates come in a variety of colors, and printed images will have to be processed at least so that a printed image has the appropriate intensity and contrast for the background color of the substrate. In a preferred embodiment, the printed image comprises white ink, and the substrate is chocolate. In this situation, the step of processing an image, for example a digital photograph or the like, will involve taking the "negative" of the digital image information, and enhancing image brightness and contrast prior to printing. This can be accomplished, for example, using an image processor such as Adobe Photoshop.

Dispersed pigmented white ink, which is discussed in more detail below, is provided to the "black" reservoir or cartridge of a black-only ink-jet printer. Obviously, if a non-white single color image is desired, a pigment based ink containing a dye would be provided to the "black" reservoir of the cartridge. If a printer with a color ink cartridge is utilized, white ink will be provided to the black reservoir and "colored" pigment based inks will be provided to the remaining reservoirs. The particular arrangement of the reservoirs is not particularly critical. It is advisable to sonicate (i.e. ultrasonically mix) the cartridge to effect dispersion of the pigments in the ink prior to printing and intermittently to prevent the nozzle from becoming clogged.

Once the printer is loaded with ink, the edible substrate is held and conveyed past the print-head (or vice versa). The edible substrate is not particularly limited. In a preferred embodiment, the substrate is a confectionery product. The substrate may be for example, chocolate, cookies, M&M®s-type candy or other sugar shell candy, or hard candy, jellybeans, starch-based, savory snacks, and gelatin-based gummi and soft candies. Even ice creams and pet food are within the scope of the invention. In a preferred embodiment, the substrate is a predominantly planar chocolate tablet.

Other embodiments of image processing according to the invention include, controlling the intensity of the brightest area of an image, electronically separating an image such that it can be printed in multiple applications of ink (i.e., multi-pass through printer), brightness equalization across the printed area, and sectional control of image brightness and contrast.

Printing on a substrate such as chocolate presents special challenges in obtaining a high quality high resolution image. The use of techniques described above have been discovered to address many of the challenges. For example, when printing using ink-jet technology onto chocolate, the compatibility of the ink with the surface is critical. The surface chemistry of the chocolate surface and that of the ink will determine the behavior to the ink droplets once they have been jetted onto the surface. By controlling the maximum level of brightness for an image, it is possible to ensure that too much ink is not jetted into a given section of a printed image. When this occurs, the ink droplets may tend to coalesce into larger droplets before the ink has had sufficient time to completely dry. This leads to a loss of resolution for the affected section of the image.

Another embodiment is to "separate the image into layers" such that the printing of the complete image is completed by multiple applications of ink. This allows sufficient time for the successive ink applications to dry before another application is made. This allows a larger total application of ink and thus brighter images while avoiding loss or resolution due to coalescence of printed droplets.

Another embodiment utilizes an approach of brightness equalization across the printed area. By adjusting the contrast and shading of the light and dark areas of an image, it is possible to enhance the overall quality of the image on a chocolate surface. This technique tends to minimize extremes of darkness or brightness and results in an improved image quality for images with very severe contrasts.

Another embodiment is to control the brightness of an image in certain sections of an image rather than of the image as a whole. Here again, the image quality and resolution will be enhanced by avoiding coalescence problems in very bright areas of the image.

These techniques will generally allow more difficult images to be printed onto chocolate in a manner to deliver a high quality, high resolution image. This is particularly valuable for images with intricate patterns which otherwise might produce lower quality or lower resolution images.

As mentioned earlier, the surface chemistry of the ink and the chocolate surface play a critical role in determining the final image quality and resolution. Other embodiments according to the invention which can have advantageous effect on image quality include, controlling the surface energy of the chocolate by changing the temperature of the substrate of the ink, using a stream of dry gas to assist the rapid drying of ink droplets on the surface of the chocolate and applying coatings to the chocolate to enhance the compatibility of the chocolate to the ink.

Temperature modulation will affect the surface energy properties of the ink and chocolate with lower temperatures lowering surface energy and reducing the tendency of an ink to spread across the chocolate surface. Applying very low humidity gas or air will enhance the drying rate of the ink droplets and can be employed effectively with the multi-pass printing embodiment discussed above. Temperature modulation of the ink cartridge can also be advantageously used to modify and or control ink rheology to maximize printing performance.

In some instances it may be desirable to enhance the compatibility of the surface of the confection by depositing a thin layer of an edible binder or other compatibility-enhancing component prior to the step of printing the image. Water-based glazes containing gums and/or corn syrups and/or oils, and/or acids and/or sugars and/or starches and/or low-carbon alcohols and/or shellacs and/or other resins provide sufficient chocolate surface modification to allow high-resolution images to be printed using the above mentioned inks. Solvent based glazes may also be useful. Commercial names of exemplary water-based glazes include, without limitation, commercially available Capol 140, Capol 120, Capol 153D, Capol 149 products, available from Centerchem Foods, Stamford, Conn. These ingredients, besides providing compatibility of inks to chocolate surface, provide a unique glazed appearance to the printed images. Other components which may be coated on the surface of an edible substrate prior to printing include surfactants, antibloom agents, micronutrients and flavor enhancers.

An example of a surfactant than can improve the compatibility of the ink with a chocolate surface is Adsurf 456K. Application of a thin layer improves the image quality and resolution significantly. Another embodiment of the invention involves the application of more than one surface pre-treatment layer prior to ink-jet printing. Among surface pre-treatments, the application of a Capol glaze to the chocolate surface provided the best surface in terms of ink compatibility. However, it is very difficult to deliver a uniform layer of the Capol glaze to the chocolate surface. Surprisingly, it has been found that combining a first pre-treatment application of a surfactant, such as Adsurf 456K, followed by a second application of Capol provides a very significantly improved surface for ink-jet printing. The sequential application of this multi-layer pre-treatment, using a foam brush, provides a smooth highly compatible surface for edible pigmented ink-jet ink. This delivers a very superior image quality and resolution. This surface is also much less prone to ink droplet coalescence problems.

The image enhancement techniques discussed in application to chocolate products are not limited to these products but are generally applicable in principle to other edible substrates.

The present invention also provides for novel high resolution printed edibles wherein the edibles have a substantially planar or substantially non-planar shape. As used herein, substantially planar includes, for example, a chocolate tablet, while substantially non-planar includes, without limitation, an interior or exterior surface having curvature, such as an egg. The novel printed edible is printed on at least one surface having localized 3-D features if substantially planar. If substantially non-planar, the printed surface may be on localized 3-D features. Localized 3-D features can include, without limitation, uneven or irregular surfaces, such as grooves, ridges, pinholes, and the like, as well as embossed or molded designs in the edible substrate.

In preferred embodiments, the edible may be moved or rotated in an appropriate manner to transiently bring a non-planar surface into correct position and distance for printing below or aside a drop on demand printer head. For example, high resolution images can be printed on a Chocolate Easter Egg by a system which holds the egg and moves it past a horizontally mounted printer head in rotational manner to present an arc of the egg surface for printing. In a particularly preferred embodiment the system will control the edible in such a manner as to transiently maintain the non-planar surface being printed at a perpendicular angle to the print head.

In another preferred embodiment, it is possible to print the interior surface of a ½ egg or ½ ball shaped product produced by shell molding and which is ultimately joined to another half to yield a hollow molded edible product.

In formulating an ink composition that is edible, ink-jettable, and which provides an acceptable high-resolution high quality image, several competing factors need to be addressed. Generally speaking, a dye-based ink will not provide an acceptably high-quality image on most edible substrates, such as dark surfaced substrates and/or non-porous materials, due to poor image contrast and therefore, the invention is directed primarily to dispersed pigmented inks.

The edible dispersed pigmented inks of the invention are generally prepared in the following manner. First, the pigment dispersion is prepared by thoroughly mixing an edible pigment with a suitable edible dispersant. Next, the pigment dispersion is carefully diluted or let-down using an edible carrier fluid to produce the dispersed pigmented ink. As the inks of the invention are water based, the carrier fluid will typically be comprised of water and an edible alcohol. Optionally, an edible surfactant may be added to the ink, either at the dispersion step or later.

In preparing dispersed pigmented inks, enough pigment must be used in the formulation to lend sufficient opacity to the printed image, and it must be ensured that the pigment is uniformly dispersed in the ink. In the production of a white ink, at least about 3 weight percent of white pigment is required to provide sufficient opacity and dispersivity in the ink. At the same time, if too much pigment is used, the resulting ink will tend to clog the nozzle orifices of an ink-jet printer, particularly a drop-on-demand ink-jet printer. Additionally, at high pigment levels, the ink viscosity is increased to levels such that flowability of ink within the ink cartridge and nozzles is restricted. Thus, an upper compositional limit for pigment in the edible ink composition according to the invention is about 55 weight percent. Where titanium dioxide is used as the pigment the desirable range is between 10-45 weight percent and the most preferred amount of pigment to use is about 13-35 weight percent. As used herein "weight percent" means percent by weight with respect to the weight of the ink composition, unless specifically stated otherwise.

Powdered materials that may be used as a pigment in the edible ink composition according to the invention include, but are not limited to: titanium dioxide, aluminum hydroxide, calcium carbonate, sucrose, and talc. Titanium dioxide is most preferred.

For use with a drop-on-demand ink-jet system, the pigment particles should have a particle size between about 0.1 and about 1.5 microns. The preferred titanium dioxide pigments have an average particle size in the range of about 0.2 to about 0.5 microns, with an average particle size of 0.3 microns being the most preferred particle size.

To prepare an ink composition according to one embodiment of the invention, first the pigments are dispersed in a dispersant to produce the pigment dispersion. Suitable dispersants include, without limitation, glycerine and/or propylene glycol and/or polypropylene glycol and other polyglycerols and polyols. A suitable amount of glycerine and/or propylene glycol and/or polypropylene glycol and other polyglycerols and polyols will serve to adequately disperse the pigment while making sure that fluid properties of the finished ink are not adversely affected. The preferred range of glycerine and/or propylene glycol and/or polypropylene glycol and other polyglycerols and polyols in the finished ink is between about 1 percent and about 48 percent.

According to the invention, other dispersants may also be used beyond those described above. The essential requirements being that the dispersant is edible and effectively disperses the pigment and does not lead to clogging problems of the printer nozzle orifice. For example, water based carbohydrate and or protein solutions may also be used to disperse the pigment. It is also possible to use combinations of dispersants. It is also possible to use salts or other compounds to charge the pigmented particles and therefore help disperse the pigments.

The ink compositions according to the invention are typically water-based. Preferably, water comprises between about 30 and about 75 weight percent of the final ink composition. In yet another embodiment, the ink composition may also be substantially free of water.

An alcohol is added to the ink composition as part of the carrier so that the image will dry quickly once printed. Any alcohol suitable for use with an edible composition that will increase the volatility, and therefore the drying speed, of the ink may be used. Lower alcohols, and in particular ethanol and isopropyl alcohol, are preferred. Enough alcohol must be used to ensure that the ink will dry quickly, but not so much that the flashpoint of the ink composition is reduced to a dangerous level. The preferred range of alcohol is between about 5 and about 70 weight percent of the final ink composition. A more preferred range is between about 7 weight percent and about 45 weight percent. The most preferred range of alcohol is between about 10 weight percent and about 25 weight percent with respect to the final ink composition.

The edible ink composition according to the invention may also comprise a surfactant to improve the compatibility of the ink with the surface of the chocolate. The surfactants that may be used in the ink of this invention include, for example, anionic surfactants, cationic surfactants and amphoteric surfactants. Of course, the surfactant used must be edible in the amounts used. The most preferred surfactants are polyglycerol oleates, monostearates, polysorbates, mono and diglycerides, commercially available under the tradenames of Adsurf 456K, Tween 60, Tween 80, Span 60, and Span 80, Myverol and Myvecet. Generally, a surfactant will be present in amounts less than about 1.0 weight percent. Most preferably, the surfactant will be present in an amount between about 0.001 and about 0.5 weight percent (based on final ink-formulation).

As the composition is an edible composition, a simple composition is preferred. The edible ink according to preferred embodiments of the invention is substantially free of shellac or polymeric binder. It has surprisingly been found that the composition as recited above, with the optional addition of a small amount of surfactant is sufficient to obtain good image durability and compatibility of the image with a chocolate substrate.

Other ingredients may be added to the ink including, but not limited to flavor enhancers and micronutrients. Such components, frequently added to the surfaces of edibles, particularly confections, would be known to one of ordinary skill in the art and include, without limitation, mint, fruit and vegetable oils, herbal extracts, cinnamon and coffee flavorings, vanillin and vanilla extracts (natural and artificial), malt flavors, vitamins, minerals, plant phytochemicals, anthocyanins, etc. Although not particularly limited in this regard, it is contemplated that these flavor enhancers and micronutrients may be present in an amount between about 0.01 weight percent and about 5 weight percent. Further, the flavor enhancers and micronutrients added according to the invention may be suitable for either human or animal palatability and health.

As noted earlier, the use of dyes on most edible substrates does not produce a satisfactory image. However, the ink composition of the present invention may include dyes in addition to the pigment. It has surprisingly been found that combining dyes with titanium dioxide pigment yields colored inks having greater intensity and opacity than when the food dyes are used as sole colorants in an ink formulation. It is also within the scope of the invention to use lakes in combination with titanium dioxide pigment in a colored ink composition.

Generally, if dyes are present, the amount will range between about 0.5 and 5.0 weight percent with respect to the edible ink composition. Water based dyes such as F D & C approved colors, natural colorants and mica-based metallic color pigments are preferred for use with the edible inks of the invention.

A consumer-driven, customizable process for producing edibles having individualized, high-resolution images printed thereon is made possible by the invention. The full scope of the invention is set forth in the appended claims, and includes equivalents and alternatives of the disclosed inks, processes, and systems and obvious variants thereof.

We claim:

1. An edible, ink-jettable, dispersed pigmented ink composition comprising:

(a) at least 3% by weight of a dispersed food-grade white pigment selected from the group consisting of titanium dioxide, aluminum hydroxide, calcium carbonate and talc;
(b) an edible dispersant;
(c) an edible alcohol; and
(d) water,
wherein said ink composition is free of shellac and polymeric binder and is ink-jettable through a drop-on-demand ink-jet system.

2. An edible ink composition according to claim 1, wherein said ink is capable of forming an image having a resolution greater than about 200 dpi using a single drop-on-demand ink jet printhead and single pass printing.

3. An edible ink composition according to claim 1, further comprising an edible surfactant.

4. An edible ink composition according to claim 1, wherein said edible dispersant is selected from the group consisting of glycerine, propylene glycol, polypropylene glycol, and mixtures thereof.

5. An edible ink composition according to claim 4, wherein said edible dispersant is glycerine.

6. An edible ink composition according to claim 4 wherein said food-grade white pigment is present in an amount of about 3 to about 55 percent by weight; said edible dispersant is present in an amount of about 1 to about 48 percent by weight; said edible alcohol is present in an amount of about 5 to about 70 percent by weight; and said water is present in an amount of about 30 to about 75 percent by weight.

7. An edible ink composition according to claim 6, further comprising an edible surfactant in an amount of less than about 1 weight percent.

8. An edible ink composition according to claim 4, wherein said ink is a food-grade ink consisting essentially of: titanium dioxide; an edible dispersant selected from the group consisting of glycerine, propylene glycol, polypropylene glycol, and mixtures thereof; an edible lower alcohol, and water.

9. An edible ink composition according to claim 8, wherein said titanium dioxide is present in an amount of about 10 to about 45 percent by weight; said edible dispersant is present in an amount of about 1 to about 48 percent by weight; said edible lower alcohol is present in an amount of about 5 to about 70 percent by weight; and said water is present in an amount of about 30 to about 75 percent by weight.

10. An edible ink composition according to claim 4, wherein said ink is a food-grade ink consisting essentially of: titanium dioxide; an edible dispersant selected from the group consisting of glycerine, propylene glycol, polypropylene glycol, and mixtures thereof; an edible lower alcohol; water, and an edible surfactant.

11. An edible ink composition according to claim 10, wherein said titanium dioxide is present in an amount of about 10 to about 45 percent by weight; said edible dispersant is present in an amount of about 1 to about 48 percent by weight; said edible lower alcohol is present in an amount of about 5 to about 70 percent by weight; said water is present in an amount of about 30 to about 75 percent by weight; and
said edible surfactant is present in an amount of less than about 1 weight percent.

12. An edible ink composition according to claim 11, wherein said edible surfactant is present in an amount of about 0.001 to about 0.5 weight percent.

13. An edible product comprising a high resolution image formed from a dispersed pigment food-grade ink according to claim 1 on at least one surface of an edible substrate.

14. An edible product according to claim 13, wherein said edible substrate is a confectionery product, cookie, starch-based savory snack, pet food, or ice cream.

15. An edible product according to claim 14, wherein said edible substrate is dark chocolate, milk chocolate, white chocolate, a sugar shell product or hard candy.

16. An edible dispersed pigmented ink composition comprising:
(a) at least 3% by weight of a dispersed food-grade white pigment selected from the group consisting of titanium dioxide, aluminum hydroxide, calcium carbonate and talc;
(b) an edible dispersant;
(c) an edible alcohol; and
(d) water,
wherein said ink composition is free of shellac and polymeric binder.

17. An edible ink composition according to claim 16, further comprising an edible surfactant.

18. An edible ink composition according to claim 16, wherein said edible dispersant is selected from the group consisting of glycerine, propylene glycol, polypropylene glycol, and mixtures thereof.

19. An edible ink composition according to claim 18, wherein said edible dispersant is glycerine.

20. An edible ink composition according to claim 16 wherein said food-grade white pigment is present in an amount of about 3 to about 55 percent by weight; said edible dispersant is present in an amount of about 1 to about 48 percent by weight; said edible alcohol is present in an amount of about 5 to about 70 percent by weight; and said water is present in an amount of about 30 to about 75 percent by weight.

* * * * *

UNITED STATES PATENT AND TRADEMARK OFFICE
CERTIFICATE OF CORRECTION

PATENT NO. : 8,414,697 B2  
APPLICATION NO. : 12/983777  
DATED : April 9, 2013  
INVENTOR(S) : Neil Willcocks et al.

Page 1 of 2

It is certified that error appears in the above-identified patent and that said Letters Patent is hereby corrected as shown below:

ON THE TITLE PAGE ITEM [56] REFERENCES CITED UNDER U.S. PATENT DOCUMENTS:

Column 2, Lines 2 and 9, "5,433,146 A 7/1995" should read --5,433,146 A 5/1995--; and "5,630,499 A 5/1997 Louden et al." should read --5,630,499 A 5/1997 Ackley--.

IN THE SPECIFICATION:

COLUMN 1:

Line 47, "to created" should read --to create--.

COLUMN 2:

Line 26, "backgrounds" should read --background--.

COLUMN 3:

Line 4, "internet," should read --Internet,--;
Line 37, "drop on demand" should read --drop-on-demand--; and
Line 54, "drop-on demand" should read --drop-on-demand--.

COLUMN 5:

Line 9, "internet." should read --Internet.--. (Both occurrences)

COLUMN 6:

Line 16, "does not chose" should read --does not choose--; and
Line 27, "other mode" should read --other modes--.

Signed and Sealed this
Twenty-second Day of October, 2013

Teresa Stanek Rea
*Deputy Director of the United States Patent and Trademark Office*

CERTIFICATE OF CORRECTION (continued)
U.S. Pat. No. 8,414,697 B2

COLUMN 9:

Line 43, "and or" should read --and/or--; and
    Line 64, "than can" should read --that can--.

COLUMN 10:

Line 36, "drop on demand" should read --drop-on-demand--.

IN THE CLAIMS:

COLUMN 14:

Line 41, "claim 16" should read --claim 16,--.